(12) United States Patent
Dai et al.

(10) Patent No.: US 10,607,389 B2
(45) Date of Patent: Mar. 31, 2020

(54) MICROSCOPIC IMAGING SYSTEM AND METHOD WITH THREE-DIMENSIONAL REFRACTIVE INDEX TOMOGRAPHY

(71) Applicant: TSINGHUA UNIVERSITY, Beijing (CN)

(72) Inventors: Qionghai Dai, Beijing (CN); Mingjie Zhang, Beijing (CN); Jiamin Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 15/944,403

(22) Filed: Apr. 3, 2018

(65) Prior Publication Data

US 2019/0005701 A1    Jan. 3, 2019

(30) Foreign Application Priority Data

Jun. 29, 2017    (CN) .......................... 2017 1 0518263

(51) Int. Cl.
     *G06T 15/00*      (2011.01)
     *G02B 21/36*      (2006.01)
     (Continued)

(52) U.S. Cl.
     CPC .............. *G06T 15/00* (2013.01); *G02B 21/06* (2013.01); *G02B 21/14* (2013.01); *G02B 21/365* (2013.01)

(58) Field of Classification Search
     CPC ........ G06T 15/00; G02B 21/06; G02B 21/14; G02B 21/365
     See application file for complete search history.

(56) References Cited

U.S. PATENT DOCUMENTS

| 6,525,875 | B1 * | 2/2003 | Lauer | G03H 1/0443 |
| | | | | 359/368 |
| 8,891,089 | B2 * | 11/2014 | Watanabe | G01J 9/02 |
| | | | | 356/457 |

(Continued)

FOREIGN PATENT DOCUMENTS

CN      106772974 A      5/2017

OTHER PUBLICATIONS

English translation of the Office Action dated Mar. 14, 2019 for corresponding Chinese Application No. 201710518263.5.

*Primary Examiner* — Maria E Vazquez Colon
(74) *Attorney, Agent, or Firm* — David D. Brush; Westman, Champlin & Koehler, P.A.

(57) ABSTRACT

Microscopic imaging system and method with three-dimensional refractive index tomography are provided. The microscopic imaging system includes: an illumination providing module, configured to provide a beam of parallel lights with a modulated intensity; a microscopic sample, arranged at downstream of the illumination providing module, and configured to modulate a phase of the beam of parallel lights, such that emergent lights passing through the microscopic sample carry information of a three-dimensional refractive index field of the microscopic sample; a microscopic imaging module, arranged at downstream of the microscopic sample, and configured to form an image by using the emergent lights; and a controlling module, configured to process the image to reconstruct three-dimensional refractive index information of the microscopic sample.

4 Claims, 2 Drawing Sheets

(51) Int. Cl.
*G02B 21/06* (2006.01)
*G02B 21/14* (2006.01)

(56) References Cited

U.S. PATENT DOCUMENTS

| | | | | |
|---|---|---|---|---|
| 2011/0075928 A1* | 3/2011 | Jeong | ................ | G02B 27/58 |
| | | | | 382/181 |
| 2011/0157599 A1* | 6/2011 | Weaver | ................ | G01D 5/266 |
| | | | | 356/496 |
| 2017/0357084 A1* | 12/2017 | Park | ................ | G01N 21/4133 |

* cited by examiner

```
┌─────────────────────────────────────────────────────────┐
│   adjusting a field of the microscopic imaging system to an │ S310
│   area without the microscopic sample, such that standard   │
│         images in a plurality of fields are obtained        │
└─────────────────────────────────────────────────────────┘
                              │
                              ▼
┌─────────────────────────────────────────────────────────┐
│    keeping structures, parameters and illumination          │ S320
│  conditions of the microscopic imaging system unchanged,    │
│     adjusting the field to include the microscopic sample,  │
│     such that a dynamic video in the plurality of fields is │
│    obtained, wherein the dynamic video comprises shifted    │
│                        image frames                         │
└─────────────────────────────────────────────────────────┘
                              │
                              ▼
┌─────────────────────────────────────────────────────────┐
│  computing matched relations between pixels of each of      │ S330
│     the shifted image frames and pixels of each of the      │
│        standard images in the plurality of fields, and      │
│   reconstructing the three-dimensional refractive index     │
│     information of the microscopic sample by using an       │
│   established light path model and a tomography principle   │
└─────────────────────────────────────────────────────────┘
```

Fig. 3

MICROSCOPIC IMAGING SYSTEM AND METHOD WITH THREE-DIMENSIONAL REFRACTIVE INDEX TOMOGRAPHY

CROSS-REFERENCE TO RELATED APPLICATION

This application claims priority to and benefits of Chinese Patent Application Serial No. 201710518263.5, filed with the State Intellectual Property Office of P. R. China on Jun. 29, 2017, the entire content of which is incorporated herein by reference.

FIELD

The present disclosure relates to the field of microscopic imaging technology, and more particularly, to a microscopic imaging system and method with three-dimensional refractive index tomography.

BACKGROUND

Three-dimensional refractive index distribution information of a sample is an important optical feature. For a transparent biological sample, the three-dimensional refractive index distribution information may provide a density and structure information of the biological sample, to give a possibility to image a three-dimensional cell that is not marked.

In an existing bioscience field or medical study, the sample is generally marked with a fluorescence imaging technology. However, once the sample is marked with fluorescence, the property of the sample may be influenced, so as to affect an experimental result. The three-dimensional refractive index imaging is to non-intrusively detect information of a three-dimensional refractive index field of the sample, thereby providing different features of different parts of the sample. Therefore, the three-dimensional refractive index imaging is a hot topic.

Recently, a variety of three-dimensional refractive index microscopic imaging methods are provided. A principle of these methods is mainly to employ coherent lights in different directions to illuminate the sample to obtain phase information in different directions. Therefore, the three-dimensional refractive index information can be computed by using a tomography algorithm. However, these methods have a high requirement on equipment and require complex systems.

Furthermore, during a process of imaging the sample, it is required to shoot the sample for many times. It is hard to obtain the three-dimensional refractive index information of the sample by only shooting the sample once. Therefore, it is a big challenge to capture images quickly.

Therefore, how to quickly and dynamically collect the three-dimensional refractive index information with a high resolution is still difficult to solve.

SUMMARY

Embodiments of the present disclosure seek to solve at least one of the problems existing in the related art to at least some extent.

Accordingly, an objective of the present disclosure is to provide a microscopic imaging system with three-dimensional refractive index tomography. The microscopic imaging system may precisely, quickly and dynamically collect information of a three-dimensional refractive index field of a sample with a high resolution and the microscopic imaging system is simple to manufacture.

In order to achieve the above objective, embodiments of the present disclosure provide a microscopic imaging system with three-dimensional refractive index tomography. The microscopic imaging system includes: an illumination providing module, configured to provide a beam of parallel lights with a modulated intensity; a microscopic sample, arranged at downstream of the illumination providing module, and configured to modulate a phase of the beam of parallel lights, such that emergent lights passing through the microscopic sample carry information of a three-dimensional refractive index field of the microscopic sample; a microscopic imaging module, arranged at downstream of the microscopic sample, and configured to form an image by using the emergent lights; and a controlling module, configured to process the image to reconstruct three-dimensional refractive index information of the microscopic sample.

Further, the illumination providing module includes: a light source module, configured to provide a direction-adjustable beam of parallel lights; and a reference pattern module, arranged between the light source module and the microscopic sample and arranged at an image plane of the light source module, and configured to modulate the intensity of the beam of parallel lights; in which the controlling module is further configured to control a direction of the direction-adjustable beam from the light source module.

Further, the reference pattern module is a film with predetermined patterns, a liquid crystal on silicon (LCOS) or a digital micromirror device (DMD) fine reflective mirror controlled by the controlling module.

Further, phases are modulated differently by the microscopic sample in different fields of the microscopic imaging system.

Further, the microscopic imaging system includes a microscopic sample moving device, configured to move the microscopic sample; in which the controlling module is configured to control the microscopic sample moving device to move the microscopic sample.

With the microscopic imaging system, by obtaining the standard images in the plurality of fields without the microscopic sample and the dynamic video including shifted image frames in the plurality of fields with the microscopic sample, the three-dimensional refractive index information of the microscopic sample with a high resolution may be obtained precisely and rapidly.

Accordingly, an objective of the present disclosure is to provide a microscopic imaging method with three-dimensional refractive index tomography. The microscopic imaging method may precisely, quickly and dynamically collect information of a three-dimensional refractive index field of a sample with a high resolution and the microscopic imaging method is simple to implement.

In order to achieve the above objective, embodiments of the present disclosure provide a microscopic imaging method with three-dimensional refractive index tomography. The microscopic imaging method is applied to the microscopic imaging system described in above embodiments. The microscopic imaging method includes:

adjusting a field of the microscopic imaging system to an area without the microscopic sample, such that standard images in a plurality of fields are obtained; keeping structures, parameters and illumination conditions of the microscopic imaging system unchanged, adjusting the field to include the microscopic sample, such that a dynamic video in the plurality of fields is obtained, wherein the dynamic video comprises shifted image frames; and computing matched relations between pixels of each of the shifted image frames and pixels of each of the standard images in the plurality of fields, and reconstructing the three-dimensional refractive index information of the microscopic sample by using an established light path model and a tomography principle.

Further, computing matched relations between pixels of each of the shifted image frames and pixels of each of the standard images in the plurality of fields, and reconstructing the three-dimensional refractive index information of the microscopic sample by using an established light path model and a tomography principle includes: computing shifts of the pixels in the plurality of fields by using a light-stream algorithm according to the shifted image frames and the standard images; and reconstructing information of a three-dimensional refractive index field according to the shifts of the pixels in the plurality of fields and by using the tomography algorithm.

With the microscopic imaging method, by obtaining the standard images in the plurality of fields without the microscopic sample and the dynamic video consisted of shifted image frames in the plurality of fields with the microscopic sample, the three-dimensional refractive index information of the microscopic sample with a high resolution may be obtained precisely and rapidly.

In order to achieve the above objective, embodiments of the present disclosure provide a non-transitory computer-readable storage medium having stored therein instructions that, when executed by a processor of a terminal, causes the terminal to perform the microscopic imaging method with three-dimensional refractive index tomography described in above embodiments.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which:

FIG. 3 is a flow chart illustrating a microscopic imaging method with three-dimensional refractive index tomography according to embodiments of the present disclosure.

DETAILED DESCRIPTION

Figure 1:
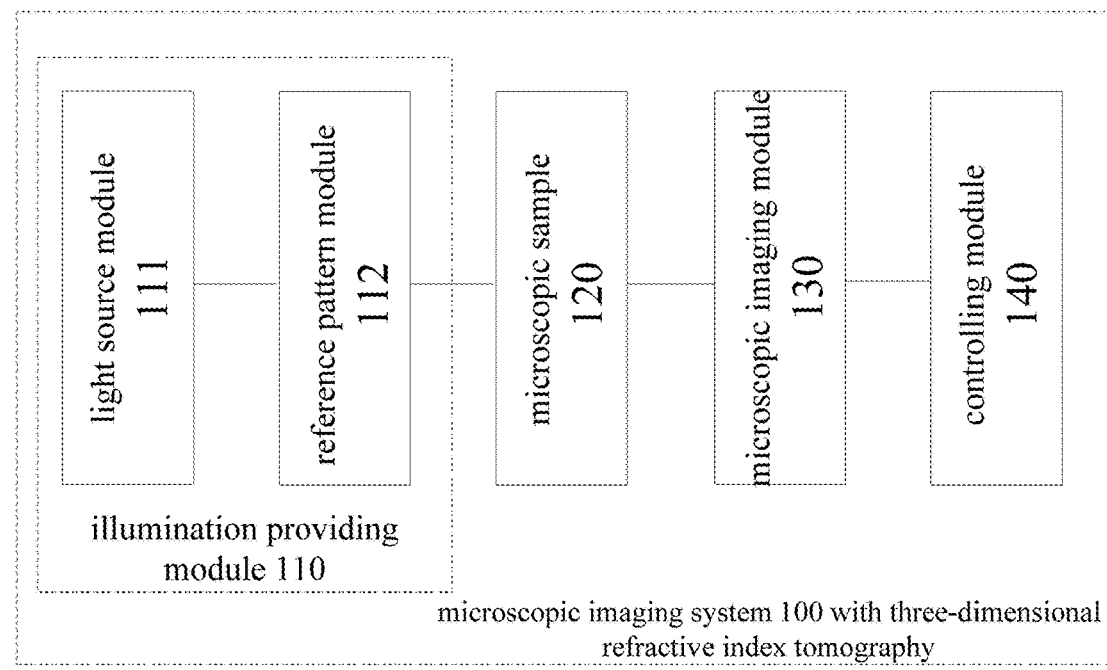
FIG. 1 is a block diagram illustrating a microscopic imaging system with three-dimensional refractive index tomography according to embodiments of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

In the description of the present disclosure, it is to be illustrated that, terms such as "central", "longitudinal", "lateral", "above", "below", "front", "rear", "left", "right", "vertical", "horizontal", "top", "bottom", "inner", "outer", as well as derivative thereof construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation and therefore are not construed to limit embodiments of the present disclosure.

In the description of the present disclosure, it should be understood that, unless specified or limited otherwise, the terms "mounted," "connected," "coupled" and variations thereof are used broadly and encompass such as fixed, removable mountings, connections and couplings, or may be integral; also may be mechanical or electrical mountings, connections and couplings; also can be direct or indirect mountings, connections and couplings, or further may be inner mountings, connections and couplings or interaction relation of two components, which can be understood by those skilled in the art according to the detail embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

Embodiments of the present disclosure will be described with reference to drawings.

FIG. 1 is a block diagram illustrating a microscopic imaging system with three-dimensional refractive index tomography according to embodiments of the present disclosure. As illustrated in FIG. 1, the microscopic imaging system 100 includes an illumination providing module 110, a microscopic sample 120, a microscopic imaging module 130 and a controlling module 140.

The illumination providing module 110 is configured to provide a beam of parallel lights with a modulated intensity.

In an embodiment of the present disclosure, the illumination providing module 110 includes a light source module 111 and a reference pattern module 112. The light source module 111 is configured to generate a direction-adjustable beam of parallel lights. A process of adjusting a direction of the direction-adjustable beam from the light source module 111 may be controlled by the controlling module 140, so as to be synchronized with a process of imaging via a sensor. The reference pattern module 112 is controlled by the controlling module 140 and configured to provide a static image with rich reference patterns required, and placed at an image plane of the light source module 111 to modulate the intensity of the beam of parallel lights.

In an embodiment of the present disclosure, the reference pattern module 112 is a film with predetermined patterns, a liquid crystal on silicon (LCOS) or a digital micromirror device (DMD) fine reflective mirror controlled by the controlling module 140.

In an embodiment of the present disclosure, a distance from a focused position of the illumination providing module 110 to the microscopic sample 120 ranges from dozens to hundreds of microns. The distance may be specifically determined according to an actual size of the microscopic sample and parameters of the microscopic imaging system.

The microscopic sample 120 is located at downstream of the illumination providing module 110. The microscopic sample 120 is configured to modulate a phase of the beam of parallel lights, such that emergent lights passing through the microscopic sample carry information of a three-dimensional refractive index field of the microscopic sample.

Figure 2:
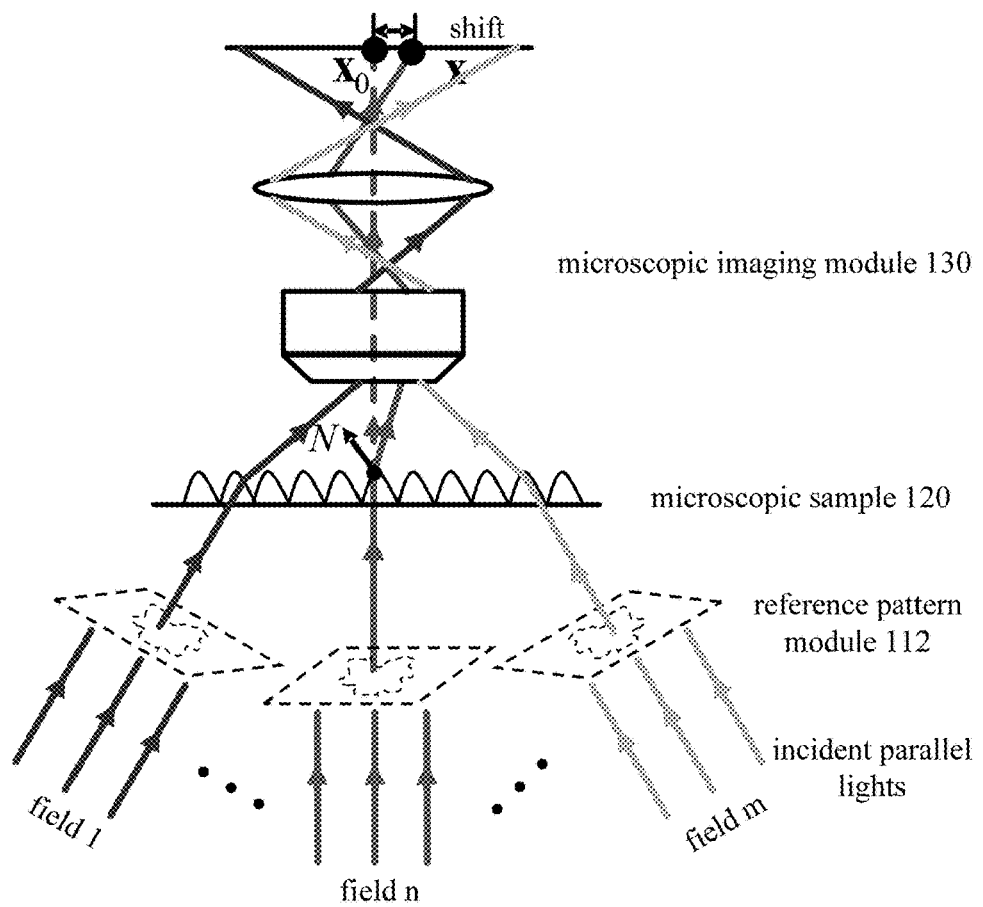
FIG. 2 is a schematic diagram illustrating a microscopic imaging system with three-dimensional refractive index tomography according to an embodiment of the present disclosure.

FIG. 2 is a schematic diagram illustrating a microscopic imaging system with three-dimensional refractive index tomography according to an embodiment of the present disclosure. As illustrated in FIG. 2, the lights from the illumination providing module 110 are focused at a focused plane that is approximate to the microscopic sample 120. It is to be illustrated that, the focused plane is an image plane of the reference pattern module 112. Then, phases of the lights passing through the microscopic sample 120 are modulated, the lights are thus shifted. In order to improve a preciseness of a restoration algorithm for restoring the shifted lights, the static image of the reference pattern module 112 is designed specifically to have a plurality of patterns.

The microscopic imaging module 130 is located at downstream of the microscopic sample 120. The microscopic imaging module 130 is configured to form an image by using the lights passing through the microscopic sample 120.

In an embodiment of the present disclosure, the microscopic imaging module 130 includes an objective lens, a tube lens and an imaging sensor. The objective lens and the tube lens are configured to image the static image of the reference pattern module 112 and the microscopic sample 120 on the imaging sensor to obtain a magnified image. The imaging sensor is configured to dynamically capture the lights passing through the objective lens and the tube lens to obtain an image.

In an embodiment of the present disclosure, a numerical aperture (NA) of the microscopic imaging module 130 is much larger than that of the illumination providing module 110.

The controlling module 140 includes a computer, a photograph controlling device, a reference-pattern controlling device, a source-scanning controlling device, a sample-moving controlling device and the like. The computer may be configured to process image information of a video collected, and to reconstruct dynamic phase information. The photograph controlling device may be configured to control photograph parameters of the imaging sensor, such as a triggered time, an exposure time and the like. The reference-pattern controlling device may be configured to control a provision of the static images with rich reference patterns via the reference pattern module 112. The source-scanning controlling module may be configured to control the direction of the parallel lights from the light source. Furthermore, the source-scanning controlling module is synchronized with the photograph controlling device such that different images in a plurality of fields may be captured consecutively and rapidly. The sample-moving controlling device may be configured to control the image plane of the reference pattern module 112 and the microscopic sample 120 to move in all directions.

With the microscopic imaging system, by capturing standard images in the plurality of fields without the microscopic sample 120 and shifted images in the plurality of fields with the microscopic sample 120, three-dimensional refractive index information of the microscopic sample 120 with a high resolution may be collected precisely and rapidly.

FIG. 3 is a flow chart illustrating a microscopic imaging method with three-dimensional refractive index tomography. As illustrated in FIG. 3, the microscopic imaging method may be applied to the microscopic imaging system 100 according to above embodiments. The microscopic imaging method includes followings.

At act S310, a field of the microscopic imaging system 100 is adjusted to an area without a microscopic sample 120, and standard images in the plurality of fields are obtained via the microscopic imaging system 100.

In detail, as illustrated in FIG. 2, by controlling an incident direction of the parallel lights from a light source via the microscopic imaging system 100, the static image with reference patterns is consecutively and rapidly captured in the plurality of fields. Therefore, the standard images in the plurality of fields are obtained. A light path indicated by a dotted line illustrated in FIG. 2 corresponds to a certain pixel of the standard image in a middle field without the microscopic sample 120. As there is no microscopic sample 120 in the light path to modulate a phase of the light passing through the reference pattern module 112, the standard images captured by the microscopic imaging system 100 are observation images of the static image with reference patterns provided by the reference pattern module 112 in the plurality of fields without the microscopic sample 120. The act S310 is a preparation work for collecting shifts described below. A focused position of the microscopic imaging system 100 is identical with a focused position of the reference pattern module 112.

At act S320, structures, parameters and illumination conditions of the microscopic imaging system 100 are kept unchanged, and the field of the microscopic imaging system 100 is adjusted to include the microscopic sample 120 to capture a dynamic video in the plurality of fields, in which the dynamic video includes shifted image frames.

In detail, as illustrated in FIG. 2, by controlling the incident direction of the parallel lights from the light source via the microscopic imaging system 100, the microscopic sample 120 is consecutively and rapidly shot in the plurality of fields. Therefore, the shifted image frames in the plurality of field are obtained at a certain moment. Light paths indicated by solid lines illustrated in FIG. 2 correspond to certain pixels of the shifted images in the plurality of fields with the microscopic sample 120. For example, for the light path corresponding to the certain pixel in the middle field with the microscopic sample 120, the light passes through the static image with reference patterns provided by the reference pattern module 112 to modulate its intensity, and then passes through the microscopic sample 120 to modulate its phase. Therefore, the dynamic video includes shifted image frames with modulated intensities and phases. Compared with the standard images, the shifted image frames have phase information to be collected. As the light paths formed in the plurality of fields are different, the phase information to be collected of the modulated phase is different from each other. Therefore, it is possible to reconstruct the information of the three-dimensional refractive index field of the microscopic sample 120. It is to be noted that, in addition to the microscopic sample 120, spatial arrangements and parameters of components included in the microscopic imaging system 100 remain unchanged with respect to that in act S310. That is, a difference between the microscopic imaging system 100 in the act S310 and the microscopic imaging system 100 in the act S320 lies in merely that no microscopic sample 120 is arranged in the microscopic imaging system 100 in the act S310, but the microscopic sample 120 is arranged in the microscopic imaging system 100 in the act S320. A distance from the position of the microscopic sample 120 to the focus position of the microscopic imaging system 100 ranges from dozens to hundreds of microns.

At act S330, matched relations between pixels of each shifted image frame of the dynamic video and pixels of each standard image in each of the plurality of fields are computed, and the three-dimensional refractive index information of the microscopic sample 120 is reconstructed according to an established light path model and a tomography principle.

In an embodiment of the present disclosure, the act S330 further includes followings.

At act S331, shifts of the pixels in the plurality of fields are computed by using a light-stream algorithm according to the shifted image frames of the dynamic video and the standard images. In detail, in an embodiment of the present disclosure, as the illumination conditions are unchanged when both of the shifted image frames and the standard images are captured, and the shifts between the shifted image frames and the standard images are small, the matched relation in each of the plurality of fields may be independently solved by using a light-stream algorithm. An optimum object function for the light-stream algorithm is described as follows.

$$J(w(x,t))=E_d(w(x, t))+\alpha E_m(w(x, t)),$$

where $J(s(x),w(x, t))$ denotes a minimum optimum object function, $E_d(w(x,t))$ denotes a date item of the optimum object function, and $E_m(w(x,t))$ denotes a shifted regular item.

Further, the date item of the optimum object function is described as follows.

$$E_d(w(x, t)) = \sum_{t=1}^{T} \int_{\Omega} \psi(\|I(x, t) - I(x + w(x, t), 0)\|_2^2 + \gamma \|\nabla I(x, t) - \nabla I(x + w(x, t), 0)\|_2^2) \, dx,$$

where T denotes the number of shifted image frames, $\Omega \subset R^2$ denotes a value range of a pixel coordinate x, $I(x, t)$ denotes a shifted image frame at a moment of t, $I(x,0)$ denotes the standard image captured in the field at a moment of t=0, $w(x, t)=[u(x, t), v(x, t)]$ denotes a difference between a shifted image frame and a standard image at the moment of t, $\psi(\xi^2)=\sqrt{\xi^2+\varepsilon^2}$ denotes a convex norm prior approximate to L1 norm, and $\varepsilon$ denotes a predetermined positive number with a relatively small value.

The shifted regular item of the optimum object function is described as follows.

$$E_m(w(x, t)) = \sum_{t=1}^{T} \int_{\Omega} \psi(\|\nabla u(x, t)\|_2^2 + \|\nabla v(x, t)\|_2^2) dx.$$

At act S332, the information of the three-dimensional refractive index field is reconstructed according to the shifts of the pixels in the plurality of fields and by using the tomography algorithm.

With the microscopic imaging method, by obtaining the standard images in the plurality of fields without the microscopic sample 120 and the dynamic video including shifted image frames in the plurality of fields with the microscopic sample 120, the three-dimensional refractive index information of the microscopic sample 120 with a high resolution may be obtained precisely and rapidly.

Furthermore, structures and functions of the microscopic imaging method with three-dimensional refractive index tomography provided in embodiments of the present disclosure are known for those skilled in the art, which is not elaborated for reducing redundancy.

Embodiments of the present disclosure provide a non-transitory computer-readable storage medium having stored therein instructions that, when executed by a processor of a terminal, causes the terminal to perform the microscopic imaging method with three-dimensional refractive index tomography described in above embodiments.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A microscopic imaging method with three-dimensional refractive index tomography, applied to a microscopic imaging system, comprising:
   adjusting a field of the microscopic imaging system to an area without a microscopic sample, such that standard images in a plurality of fields are obtained;
   keeping structures, parameters and illumination conditions of the microscopic imaging system unchanged, adjusting the field to include the microscopic sample, such that a dynamic video in the plurality of fields is obtained, wherein the dynamic video comprises shifted image frames; and
   computing matched relations between pixels of each of the shifted image frames and pixels of each of the standard images in the plurality of fields, and reconstructing a three-dimensional refractive index information of the microscopic sample by using an established light path model and a tomography principle, comprising:
      computing shifts of the pixels in the plurality of fields by using a light-stream algorithm according to the shifted image frames and the standard images, wherein an optimum object function for the light-stream algorithm is expressed by:

$$J(w(x,t))=E_d(w(x,t))+\alpha E_m(w(x,t)),$$

where J(s(x), w(x,t)) denotes a minimum optimum object function, $E_d$(w(x,t)) denotes a date item of the optimum object function, and $E_m$(w(x, t)) denotes a shifted regular item; and reconstructing information of a three-dimensional refractive index field according to the shifts of the pixels in the plurality of fields and by using the tomography algorithm.

2. The microscopic imaging method according to claim 1, wherein the date item of the optimum object function is expressed by:

$$E_d(w(x,t)) = \sum_{t=1}^{T} \int_{\Omega} \psi(\|I(x,t) - I(x+w(x,t),0)\|_2^2 + \gamma\|\nabla I(x,t) - \nabla I(x+w(x,t),0)\|_2^2) dx,$$

where T denotes the number of shifted image frames, $\Omega \subset R^2$ denotes a value range of a pixel coordinate x, I(x, t) denotes a shifted image frame at a moment of t, I(x,0) denotes the standard image captured in the field at a moment of t=0, w(x, t)=[u(x, t), v(x, t)] denotes a difference between a shifted image frame and a standard image at the moment of t, $\psi(\xi^2)=\sqrt{\xi^2+\varepsilon^2}$ denotes a convex norm prior approximate to L1 norm, and $\varepsilon$ denotes a predetermined positive number with a relatively small value.

3. The microscopic imaging method according to claim 2, wherein the shifted regular item of the optimum object function is expressed by:

$$E_m(w(x,t)) = \sum_{t=1}^{T} \int_{\Omega} \psi(\|\nabla u(x,t)\|_2^2 + \|\nabla v(x,t)\|_2^2) dx.$$

4. A non-transitory computer-readable storage medium having stored therein instructions that, when executed by a processor of a terminal, causes the terminal to perform a microscopic imaging method with three-dimensional refractive index tomography, the method comprising:

adjusting a field of the microscopic imaging system to an area without the microscopic sample, such that standard images in a plurality of fields are obtained;

keeping structures, parameters and illumination conditions of the microscopic imaging system unchanged, adjusting the field to include the microscopic sample, such that a dynamic video in the plurality of fields is obtained, wherein the dynamic video comprises shifted image frames; and computing matched relations between pixels of each of the shifted image frames and pixels of each of the standard images in the plurality of fields, and reconstructing the three-dimensional refractive index information of the microscopic sample by using an established light path model and a tomography principle, comprising:

computing shifts of the pixels in the plurality of fields by using a light-stream algorithm according to the shifted image frames and the standard images, wherein an optimum object function for the light-stream algorithm is expressed by:

$$J(w(x,t))=E_d(w(x,t))+\alpha E_m(w(x,t)),$$

where J(s(x),w(x,t)) denotes a minimum optimum object function, $E_d$(w(x, t)) denotes a date item of the optimum object function, and $E_m$(w(x, t)) denotes a shifted regular item; and reconstructing information of a three-dimensional refractive index field according to the shifts of the pixels in the plurality of fields and by using the tomography algorithm.

* * * * *